US010897770B2

(12) United States Patent
Fukuta et al.

(10) Patent No.: US 10,897,770 B2
(45) Date of Patent: Jan. 19, 2021

(54) COMMUNICATION SYSTEM, METHOD AND NON-TRANSITORY COMPUTER-READABLE STORAGE MEDIUM

(71) Applicant: FUJITSU LIMITED, Kawasaki (JP)

(72) Inventors: Shigeki Fukuta, Setagaya (JP); Jun Kakuta, Yokohama (JP); Akinori Iwakawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/058,464

(22) Filed: Aug. 8, 2018

(65) Prior Publication Data
US 2019/0069306 A1   Feb. 28, 2019

(30) Foreign Application Priority Data

Aug. 23, 2017  (JP) .................................. 2017-160647

(51) Int. Cl.
*H04W 72/08* (2009.01)
*H04W 40/02* (2009.01)
(Continued)

(52) U.S. Cl.
CPC .......... *H04W 72/085* (2013.01); *H04L 45/22* (2013.01); *H04L 45/28* (2013.01); *H04W 40/02* (2013.01); *H04W 84/18* (2013.01); *H04W 88/16* (2013.01)

(58) Field of Classification Search
CPC ... H04W 72/085; H04W 72/08; H04W 40/02; H04W 40/00; H04W 84/18; H04W 84/00;
(Continued)

(56) References Cited

U.S. PATENT DOCUMENTS 6,754,189 B1 *   6/2004   Cloutier ................ H04W 76/10
                                                              370/329
2002/0191573 A1 *   12/2002   Whitehill .............. H04L 1/0002
                                                              370/338
(Continued)

FOREIGN PATENT DOCUMENTS

JP        H05-206936 A      8/1993
JP        2014-039261 A     2/2014
WO        2010/110216 A1    9/2010

*Primary Examiner* — Jeffrey M Rutkowski
*Assistant Examiner* — Sudesh M Patidar
(74) *Attorney, Agent, or Firm* — Fujitsu Patent Center

(57) ABSTRACT

A communication system includes a first communication apparatus included in an ad hoc network, and a second communication apparatus included in an ad hoc network, the second communication apparatus being coupled to a gateway and being configured to receive data from the first communication apparatus, wherein the first communication apparatus includes a memory, and a processor coupled to the memory and configured to acquire first information regarding communication quality between the first communication and each of a plurality of adjacent nodes in the ad hoc network, determine, based on the first information, a number of the adjacent nodes whose communication quality with the first communication apparatus is equal to or greater than a first value, and control, based on the number, a transmission amount of the data transmitted to the second communication apparatus through the ad hoc network.

20 Claims, 14 Drawing Sheets

(51) Int. Cl.
*H04L 12/707* (2013.01)
*H04L 12/703* (2013.01)
*H04W 88/16* (2009.01)
*H04W 84/18* (2009.01)

(58) Field of Classification Search
CPC ...... H04W 88/16; H04W 88/00; H04L 45/20; H04L 45/22; H04L 45/28
USPC .......................................................... 370/329
See application file for complete search history.

(56) References Cited

U.S. PATENT DOCUMENTS

| | | | |
|---|---|---|---|
| 2005/0143013 A1* | 6/2005 | Jha ........................ | H04L 1/0001 455/69 |
| 2006/0056382 A1* | 3/2006 | Yamada ................ | H04W 28/18 370/349 |
| 2006/0223444 A1* | 10/2006 | Gross ................... | H04B 17/382 455/67.13 |
| 2009/0147714 A1* | 6/2009 | Jain ................... | H04W 52/0216 370/311 |
| 2009/0265475 A1* | 10/2009 | Fujita ...................... | H04L 45/20 709/231 |
| 2011/0170443 A1* | 7/2011 | Murias .................. | H04W 40/28 370/252 |
| 2016/0285640 A1* | 9/2016 | Kapur ................. | H04L 41/0833 |
| 2018/0234978 A1* | 8/2018 | Shao ................. | H04W 72/0453 |

* cited by examiner

FIG. 7

| COMMUNICATION STATE | | | | NODE STATE | | |
|---|---|---|---|---|---|---|
| RSSI (dBm) | PACKET ERROR RATE (%) | RESPONSE TIME (msec) | ROUTE REDUNDANCY | | MOVEMENT STATE | LOAD STATE |
| -65 | 2 | 5 | 1 | | NOT MOVING | NORMAL |

| ADJACENT NODE ID | COMMUNICATION STATE | | | ROUTE REDUNDANCY | NODE STATE | |
|---|---|---|---|---|---|---|
| | RSSI (dBm) | PACKET ERROR RATE (%) | RESPONSE TIME (msec) | | MOVEMENT STATE | LOAD STATE |
| XX:XX:XX:03 | -65 | 2 | 5 | 1 | NOT MOVING | ABNORMAL |
| XX:XX:XX:05 | -50 | 0 | 10 | 0 | NOT MOVING | NORMAL |
| XX:XX:XX:08 | -80 | 13 | 10 | 1 | MOVING | NORMAL |
| XX:XX:XX:0A | -90 | 45 | 25 | 1 | NOT MOVING | NORMAL |
| XX:XX:XX:10 | -70 | 5 | 5 | 2 | MOVING | NORMAL |
| XX:XX:XX:28 | -85 | 12 | 15 | 1 | MOVING | NORMAL |

| PRIORITY | ADJACENT NODE ID | COMMUNICATION STATE | | | ROUTE REDUNDANCY | NODE STATE | |
|---|---|---|---|---|---|---|---|
| | | RSSI (dBm) | PACKET ERROR RATE (%) | RESPONSE TIME (msec) | | MOVEMENT STATE | LOAD STATE |
| 1 | XX:XX:XX:05 | -50 | 0 | 10 | 0 | NOT MOVING | NORMAL |
| 2 | XX:XX:XX:03 | -65 | 2 | 5 | 1 | NOT MOVING | ABNORMAL |
| 3 | XX:XX:XX:10 | -70 | 5 | 5 | 2 | MOVING | NORMAL |
| 4 | XX:XX:XX:08 | -80 | 13 | 10 | 1 | MOVING | NORMAL |
| 5 | XX:XX:XX:28 | -85 | 12 | 15 | 1 | MOVING | NORMAL |
| 6 | XX:XX:XX:0A | -90 | 45 | 25 | 1 | NOT MOVING | NORMAL |

133

COMMUNICATION SYSTEM, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-160647, filed on Aug. 23, 2017, the entire contents of which are incorporated herein by reference.

FIELD

The embodiments discussed herein are related to a communication system, a method and a non-transitory computer-readable storage medium.

BACKGROUND

Use of IoT (Internet Of Things) technology is under consideration, for example, as a solution for monitoring flood of rivers or sewer channels or for detecting failures or abnormalities in apparatuses or devices or human operators in factories or worksites. In this type of solution, many sensors are installed over a wide area and detect water levels, temperatures, and the like and transmit data thereof to a particular server or the like.

As for a technique to transmit sensed data, from the point of view of cost, a wireless communication system which does not use communication cables is more popular than a wired communication system using communication cables. An ad hoc network is known as a technique to flexibly build a multihop communication route between nodes in an outward environment in which situations may often change as described above. In the ad hoc network, access points such as base stations are not used, but a communication route is easily built between each sensor and a server by establishing links between wireless communication terminals at respective nodes. A description of related art may be found, for example, in Japanese Laid-open Patent Publication No. 2014-39261.

SUMMARY

According to an aspect of the invention, a communication system includes a first communication apparatus included in an ad hoc network, and a second communication apparatus included in the ad hoc network, the second communication apparatus being coupled to a gateway and being configured to receive data from the first communication apparatus, wherein the first communication apparatus includes a memory, and a processor coupled to the memory and configured to acquire first information regarding communication quality between the first communication and each of a plurality of adjacent nodes in the ad hoc network, determine, based on the first information, a number of the adjacent nodes whose communication quality with the first communication apparatus is equal to or greater than a first value, and control, based on the number, a transmission amount of the data transmitted to the second communication apparatus through the ad hoc network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a state data table.

FIG. 8 is a diagram illustrating an example of a collection data table.

FIG. 14 is a diagram illustrating an example of selecting information regarding a communication state to be transmitted.

DESCRIPTION OF EMBODIMENTS

In an ad hoc network, each node individually switches a communication route depending on a communication state using a router function, and thus the configuration of the ad hoc network dynamically changes. To handle this situation, a management apparatus of the ad hoc network collects management data in terms of, for example, an adjacency relationship between nodes, an error rate, a received signal strength indicator (RSSI: Received Signal Strength Indicator) and the like from each wireless communication terminal and detects the network configuration from the detected management data.

However, in the wireless communication terminal, it is desirable to achieve a small size, low power consumption, and low cost, and thus a wide enough communication bandwidth is not available to transmit a large amount of management data. For example, at a node coupled to a gateway of the management apparatus, a large amount of data gathers because not only detection data from the sensor but also a large amount of management data is transmitted to it from a plurality of other nodes via sequential transferring from one node to another, which cause a possibility that the communication bandwidth becomes insufficient.

If the wireless communication terminal at each node reduces the transmission amount of management data, it is possible to resolve the problem with the insufficiency of the communication bandwidth. However, this may cause a possibility that a sufficient amount of management data is not collected, which may result in a reduction in usefulness of management data, and thus there is a possibility that a problem may occur in a network management.

Figure 1:
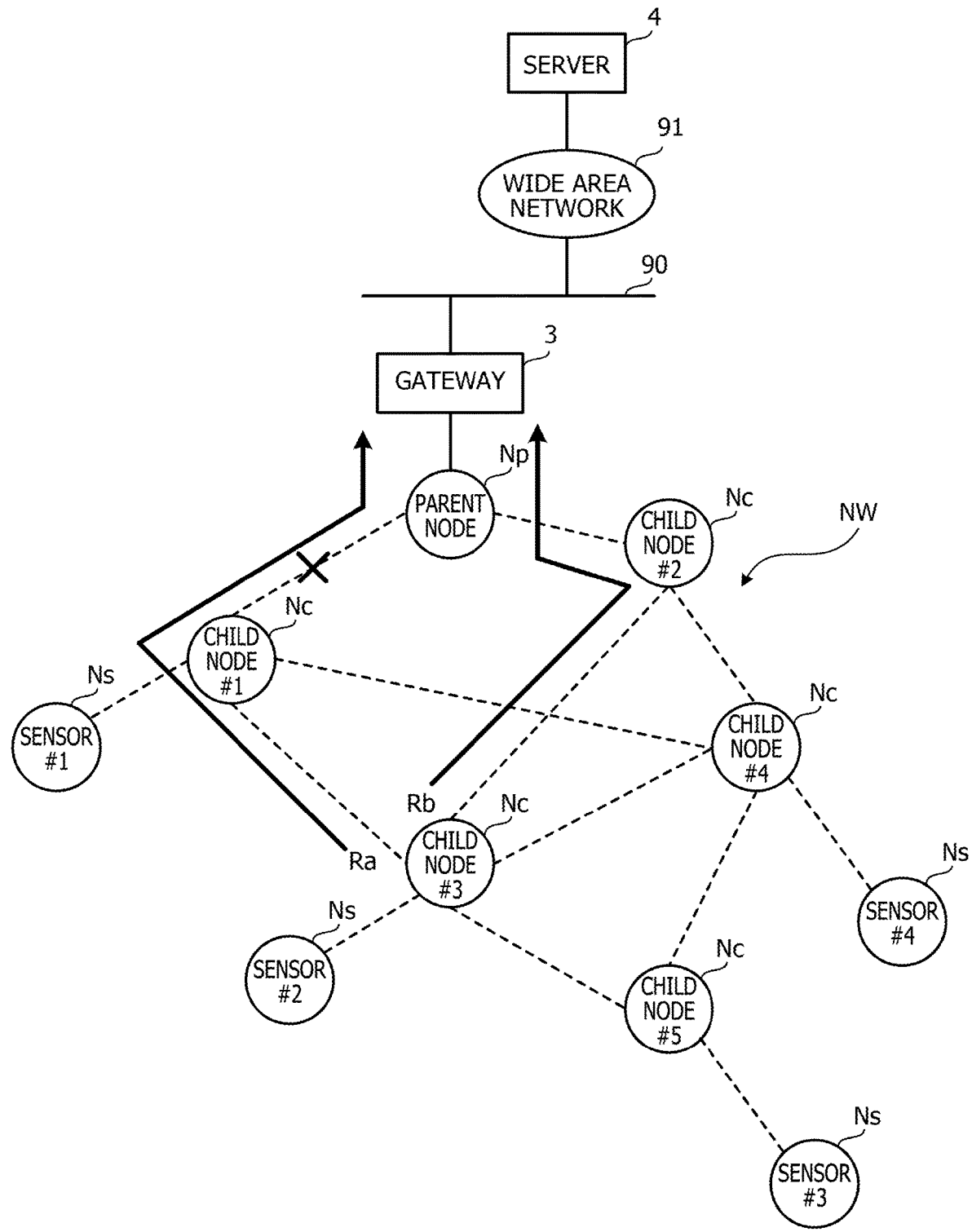
FIG. 1 is a diagram illustrating an example of a configuration of an ad hoc network.

FIG. 1 is a block diagram illustrating an example of an ad hoc network NW. The ad hoc network NW includes a parent node Np and a plurality of child nodes (#1 to #5) Nc at each of which there is a wireless communication terminal. The wireless communication terminal at the parent node Np is installed at a particular location and the wireless communication terminal at each child node Nc is installed at a particular location or provided on a mobile object (a human, a machine, or the like).

The wireless communication terminal at the parent node Np is an example of a first communication apparatus, and the wireless communication terminal at each child node Nc is an example of a second communication apparatus or a communication apparatus. The communication apparatuses at the parent node Np and the child nodes Nc form an example of a communication system. Hereinafter, the wireless communication terminal at the parent node Np will be referred simply as the "parent node Np", and the wireless communication terminal at each child node Nc will be referred to simply as the "child node Nc".

The parent node Np is directly coupled to a gateway 3 configured to relay communication to a server 4. The gateway 3 is coupled to the server 4 on a wide area network 91 such as the Internet via, for example, a wired LAN (Local Area Network) 90. The child node Nc communicates with the server 4 by accessing the gateway 3 via the parent node Np.

The parent node Np communicates with a child node Nc located close to the parent node Np by establishing a link to the child node Nc as represented by a broken line. Communication between child nodes Nc located close to each other is accomplished by making a link between them as represented by a broken line. More specifically, for example, the parent node Np is linked to a child node (#1) Nc and a child node (#2) Nc, and the child node (#2) Nc is linked to the parent node Np and a child node (#3) Nc and a child node (#4) Nc.

Communication between the parent node Np and a child node Nc and communication between child nodes Nc are performed according to a protocol such as Wi-SUN, ZigBee, or the like.

The parent node Np and a child node Nc communicate with a nearby sensor Ns by establishing a link thereto. For example, the child node (#1) Nc is linked to a sensor (#1) Ns, and the child node (#3) Nc is linked to a sensor (#2) Ns. Communication between the parent node Np or a child node Nc and a sensor Ns is performed according to a protocol such as BLE (Bluetooth Low Energy) (registered trademark) or the like.

The sensor Ns is installed at, for example, an outdoor location and detects a water level, a temperature, or the like of a river, a sewer channel, or the like. The sensor Ns transmits, for example, periodically, data of detected values (hereinafter referred to as "detection data") to the parent node Np or a child node Nc. In the present example, the sensor Ns is installed separately from the parent node Np and the child node Nc. However, a sensor function similar to that of the sensor Ns may be provided in at least one of the parent node Np and the child node Nc.

When the child node Nc receives detection data from the sensor Ns, the child node Nc transmits the detection data to the parent node Np. The child node Nc searches for a multihop communication route to the parent node Np by a router function. For example, the child node (#3) Nc transmits the detection data to the parent node Np via a communication route Ra passing through the child node (#1) Nc.

In a case where a failure occurs in a communication route, a child node Nc changes the communication route to bypass a link having the failure. For example, in a case where a failure (denoted by a symbol x) occurs in the communication route Ra as a result of decoupling of a link between the parent node Np and the child node (#1) Nc, the child node (#3) Nc changes the communication route to the parent node Np from the communication route Ra to a communication route Rb passing through the child node (#2) Nc.

The parent node Np receives detection data from each sensor Ns directly or indirectly via one or more child nodes Nc, and transmits the received detection data to the gateway 3. The gateway 3 transfers the detection data to the server 4.

The server 4 collects detection data from each sensor Ns by communicating with the parent node Np and child nodes Nc via the gateway 3. For example, using the detection data, the server 4 provides a cloud service via the wide area network 91.

The server 4 also functions as a management apparatus that manages the ad hoc network NW. To detect a network configuration, the server 4 collects, from each wireless communication terminal, management data in terms of, for example, an adjacency relationship between the parent node Np and the child nodes Nc, an adjacency relationship between child nodes Nc, an error rate, and a received signal strength indicator. Note that the management data is an example of second data used in the management of the ad hoc network NW.

However, in the wireless communication terminal, it is desirable to achieve a small size, low power consumption, and low cost, and thus a wide enough communication bandwidth is not available to transmit a large amount of management data. For example, at the child node (#1) Nc and the child node (#2) Nc linked to the parent node Np, a large amount of data gathers because not only detection data from the sensor Ns but also a large amount of management data are transmitted to them from other child nodes (#3 to #5) Nc via sequential transferring from one node to another, and thus a large amount of data gathers, which cause a possibility that the communication bandwidth becomes insufficient.

If the parent node Np and the child nodes Nc reduce the transmission amount of management data, it is possible to solve the problem with the insufficiency of the communication bandwidth. However, this may result in insufficiency of the amount of collected management data, which results in a reduction in usefulness of the collected management data. As a result, there is a possibility that a problem may occur in the network management.

To handle the above situation, the child node Nc estimates the route redundancy based on the data regarding the state of communication with adjacent nodes Np and Nc, and controls the transmission amount of the management data depending on the route redundancy. Note that the route redundancy is represented by the number of adjacent nodes (Np, Nc) capable of providing a communication route with communication quality satisfying a particular criterion (hereinafter, referred to as a "high-quality route").

This makes it possible for the child node Nc to reduce the transmission amount of the management data depending on the reliability of the communication route of each adjacent node (Np, Nc). For example, the transmission amount of the management data may be controlled such that the higher the risk of decoupling of a communication route, the greater amount of management data is transmitted. Thus, the server 4 is capable of analyzing the configuration of the ad hoc network NW based on the management data and making a prediction in terms of, for example, recovery and avoidance of failures on communication routes.

Thus, the child node Nc is capable of reducing the transmission amount of management data without causing a reduction in usefulness of the data. A format of a packet containing management data is described below, and furthermore, controlling of the transmission amount is described for specific examples.

Figure 2:
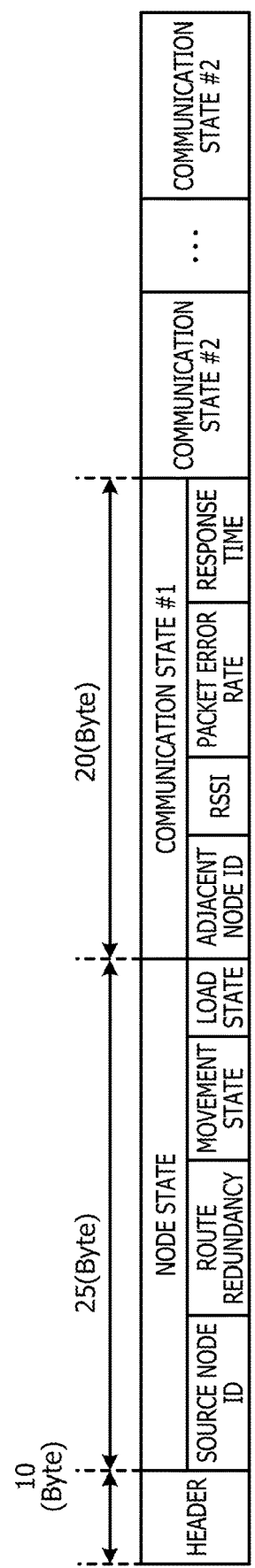
FIG. 2 is a diagram illustrating an example of a format of a packet containing management data.

FIG. 2 is a diagram illustrating an example of a format of a packet containing management data. The packet includes a header including information regarding a destination, a sender, and the like, and the packet also includes management data including information regarding a node state and communication states #1 to #n (n: integer equal to or greater than 1).

The node state is a state of the parent node Np or the child node Nc which is a sender of data. The node state includes, for example, a sender node ID, a route redundancy, a movement state, and a load state (for example, a CPU load state). The sender node ID indicates, for example, a MAC (Media Access Control) address of a parent node Np or a child node Nc which is a sender of data. The route redundancy is as described above.

The movement state indicates whether the parent node Np or the child node Nc which is a sender of data is moving or not moving. Note that the parent node Np is in a not-moving state.

The load state indicates whether a processing load imposed on the sender parent node Np or child node Nc is normal or abnormal (overload). For example, in a case where the load is lower than a particular criterion value, the load state is regarded as normal, while in a case where the load is higher than the particular criterion value, the load is regarded as abnormal.

The communication states #1 to #n indicate states of communication of respective links of adjacent nodes (Np, Nc). The communication states #1 to #n each include, for example, an adjacent node ID, RSSI, a packet error rate (PER), and a response time. The adjacent node ID indicates, for example, a MAC address of an adjacent node (Np, Nc).

RSSI is a received signal strength indicator of a radio wave received by an adjacent node (Np, Nc) from a sender node (Np, Nc). The packet error rate is an error rate of data transmitted from an adjacent node (Np, Nc) to a sender node (Np, Nc). The response time is an elapsed time from transmission of data from an adjacent node (Np, Nc) to reception of a response from the sender node (Np, Nc).

Note that the information described by the communication states #1 to #n is an example of first data regarding the state of communication with each adjacent node (Np, Nc) in the ad hoc network NW. The information represented by the communication states #1 to #n is not limited to the example described above, but the information may include, for example, a communication channel utilization rate, the number of adjacent nodes (Np, Nc) with which communication has been performed in a particular time, or the like.

For example, the size of the header is 10 (Bytes), the size of the node state information is 25 (Bytes), and the size of the information on each communication state (#1 to #n) 20 (Bytes). The maximum packet size varies depending on a specific packet. For example, in the case of ZigBee, the maximum packet size is 127 (Bytes).

The total size of information regarding the communication states #1 to #n increases with the number of links, and thus the amount of data can be larger than that of the header or the information regarding the node state. Therefore, depending on the number of links n, all information regarding the communication states #1 to #n is not contained in one packet. In such a case, fragmentation may be performed such that the information is divided and distributed among a plurality of packets. In this case, the ratio of the management data occupying the communication band increases compared with a case in which the fragmentation is not performed.

Therefore, the parent node Np or the child node Nc may effectively reduce the transmission amount of the management data by controlling, depending on the route redundancy, the transmission amount of the information regarding the communication states #1 to #n in the management data. Note that regardless of the route redundancy, the parent node Np and the child node Nc may transmit the information regarding the node state in the management data to the server 4.

Figure 3:
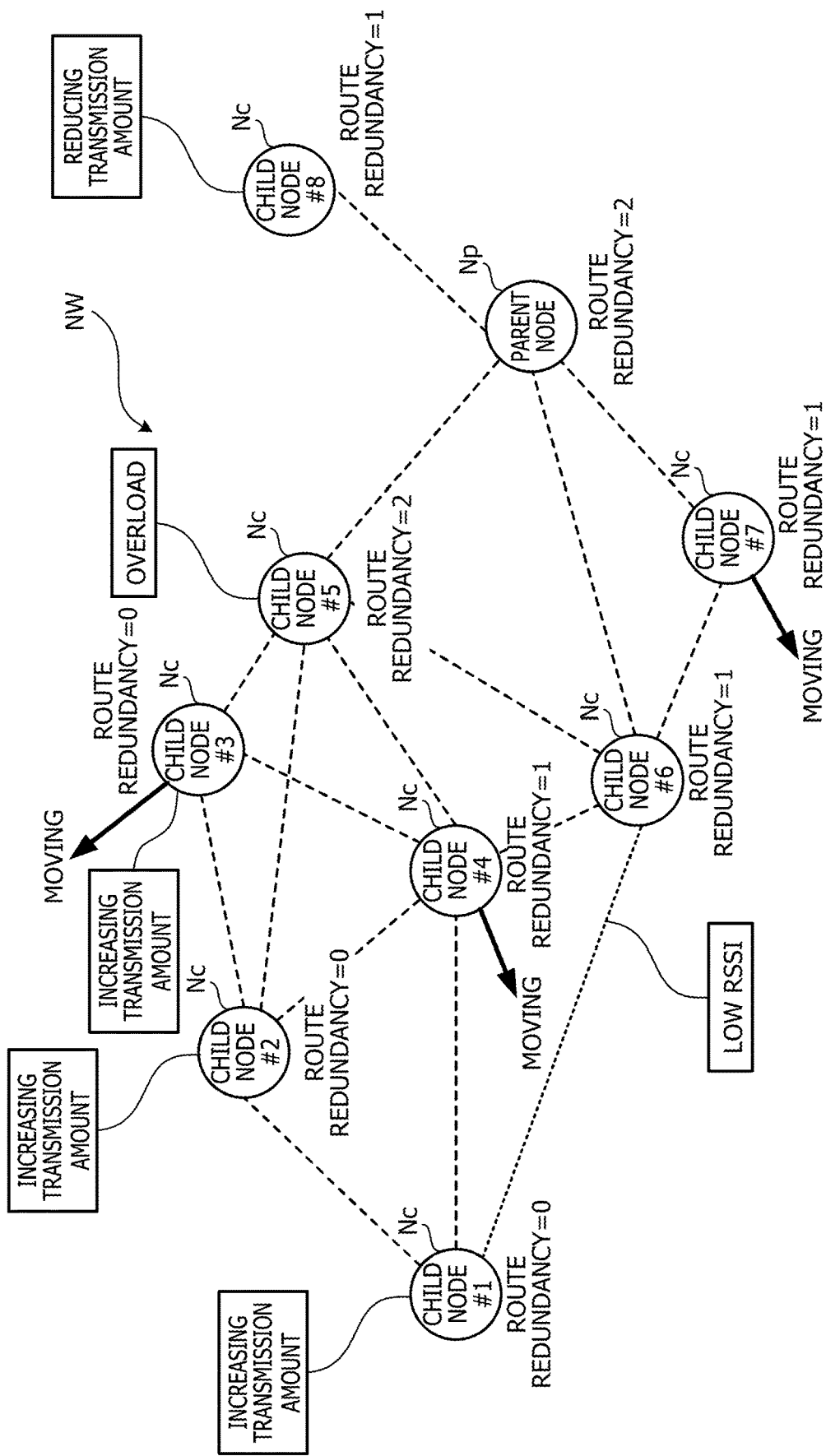
FIG. 3 is a diagram illustrating an example of a manner of controlling a transmission amount of management data.

FIG. 3 is a diagram illustrating an example of a manner of controlling the transmission amount of the management data. In this example, the ad hoc network NW includes a parent node Np and child nodes (#1 to #8) Nc.

The parent node Np is linked to child nodes (#5 to #8) Nc, and the child node (#1) Nc is linked to the child node (#2) Nc, the child node (#4) Nc, and the child node (#6) Nc. The child node (#2) Nc is linked to the child node (#1) Nc and the child nodes (#3 to #5) Nc, and the child node (#3) Nc is linked to the child node (#2) Nc, the child node (#4) Nc, and the child node (#5) Nc.

The child node (#4) Nc is linked to the child nodes (#1 to #3) Nc, the child node (#5) Nc, and the child node (#6) Nc, while the child node (#5) Nc is linked to the child nodes (#2 to #4) Nc, the child node (#6) Nc, and the parent node Np. The child node (#7) Nc is linked to the child node (#6) Nc and the parent node Np. The child node (#8) Nc is linked to the parent node Np.

Each of the child nodes (#1 to #8) Nc searches for a communication route to the parent node Np and transmits a packet containing management data via the detected communication route. The parent node Np transmits the management data received from the child nodes (#1 to #8) Nc together with the management data associated with the parent node Np to the gateway 3.

Each child node Nc estimates route redundancy based on the communication state and the node state of each adjacent node (Np, Nc). In FIG. 3, the route redundancy of each child node Nc is represented.

For example, the child node (#1) Nc estimates the route redundancy based on the communication states and the node states of adjacent nodes, that is, the child node (#2) Nc, the child node (#4) Nc, and the child node (#6) Nc.

More specifically, because the child node (#2) Nc has a route redundancy of 0, the child node (#1) Nc determines that the child node (#2) Nc is an adjacent node that is not capable of providing a high quality route. On the other hand, the child node (#4) Nc is moving, and thus the child node (#1) Nc determines that the child node (#4) Nc is an adjacent node that is not capable of providing a high quality route. The child node (#6) Nc has an RSSI lower than a predetermined value, and thus the child node (#1) Nc determines that the child node (#6) Nc is an adjacent node that is not capable of providing a high quality route.

Thus, because the number of adjacent nodes that can provide a high quality route is 0, the child node (#1) Nc determines that the route redundancy is 0. In a case where the threshold value of the route redundancy is 1, the route redundancy is lower than the threshold value, and thus the child node (#1) Nc increases the transmission amount of the management data so as to be greater than in a case where the route redundancy is equal to or higher than the threshold value (as denoted by "increasing transmission amount" in FIG. 3).

The child node (#2) Nc estimates the route redundancy based on the communication state and the node state of the child node (#1) Nc and the child nodes (#3 to #5) Nc existing as adjacent nodes.

More specifically, because the child node (#1) Nc has a route redundancy of 0, the child node (#2) Nc determines that the child node (#1) Nc is an adjacent node that is not capable of providing a high quality route. The child node (#3) Nc and the child node (#4) Nc are moving, and thus the child node (#2) Nc determines that the child node (#3) Nc and the child node (#4) Nc are adjacent nodes that are not capable of providing a high quality route. The child node (#5) Nc is in an overload state, and thus the child node (#2) Nc determines that the child node (#5) Nc is an adjacent node that is not capable of providing a high quality route.

Thus, Thus, because the number of adjacent nodes that can provide a high quality route is 0, the child node (#2) Nc determines that the route redundancy is 0. Because the route redundancy is lower than the threshold value (=1), the child node (#2) Nc increases the transmission amount of the management data so as to be greater than in a case in which the route redundancy is equal to or higher than the threshold value (as denoted by "increasing transmission amount" in FIG. 3).

The child node (#8) Nc estimates the route redundancy based on the communication state and the node state of the parent node Np. The parent node Np satisfies all conditions for providing a high quality route, and thus the child node (#8) Nc determines that the route redundancy is 1. Because the route redundancy is higher than or equal to the threshold value (=1), the child node (#8) Nc reduces the transmission amount of the management data so as to be lower than in a case in which the route redundancy is equal to or lower than the threshold value (as denoted by "reducing transmission amount" in FIG. 3).

As described above, the child node Nc estimates the route redundancy based on the communication state and the node state of adjacent nodes (Np, Nc), and increases or reduces the transmission amount of the management data depending on the route redundancy. This makes it possible for the child node Nc to suppress the transmission amount of the management data by an amount depending on the reliability of the communication route of each adjacent node (Np, Nc). Therefore, it becomes possible to control the transmission amount of the management data such that the higher the risk of decoupling of a communication route, the greater amount of management data is transmitted.

Next, configurations of the gateway 3, the server 4, the child node Nc, and the parent node Np are described below.

Figure 4:
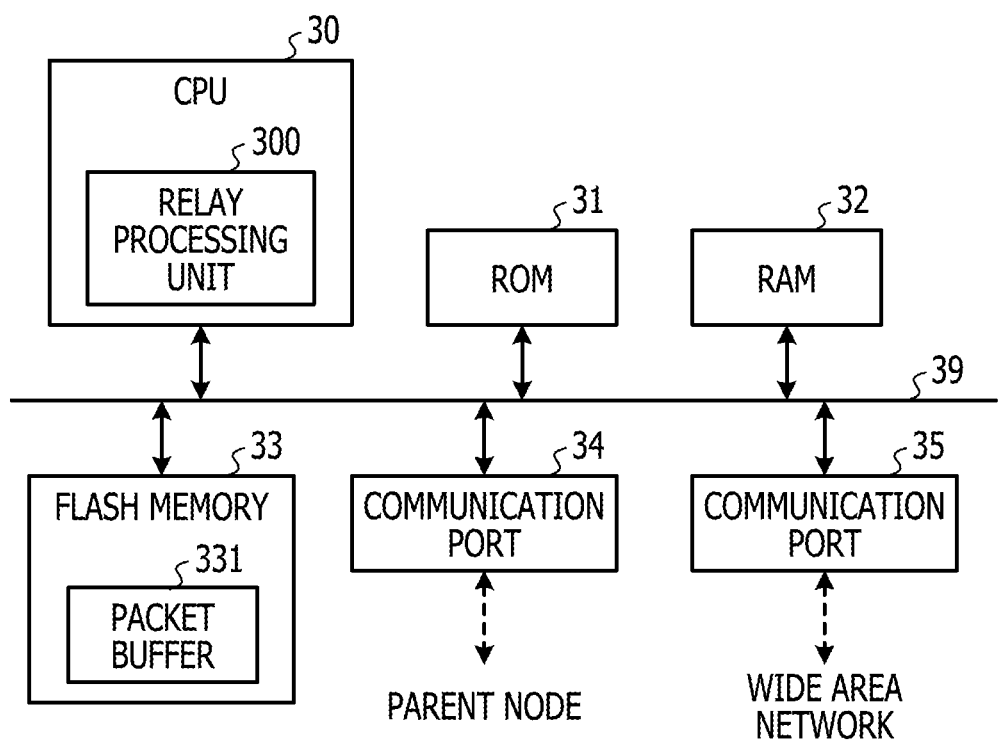
FIG. 4 is a block diagram illustrating an example of a gateway.

FIG. 4 is a block diagram illustrating an example of the gateway 3. The gateway 3 relays communication between the server 4 on the wide area network 91 and the parent node Np and the child node Nc in the ad hoc network NW. For example, the gateway 3 receives management data and detection data from the parent node Np and the child node Nc, and transfers the received data to the server 4.

The gateway 3 includes a CPU (Central Processing Unit) 30, a ROM (Read Only Memory) 31, a RAM (Random Access Memory) 32, a flash memory 33, and communication ports 34 and 35. The CPU 30 is coupled, via a bus 39, to the ROM 31, the RAM 32, the flash memory 33, and the communication ports 34 and 35 such that a signal can be input/output between each other.

In the ROM 31, a program for driving the CPU is stored. The RAM 32 functions a working memory of the CPU 30. The flash memory 33 includes a packet buffer 331 for storing a packet containing management data, a packet containing detection data, or the like.

The communication port 34 is, for example, a USB (Universal Serial Bus) controller and processes communication with the parent node Np. The communication port 35 is, for example, a LAN controller, and processes communication with the wide area network 91 via the LAN 90, that is, communication with the server 4. Note that the communication ports 34 and 35 each are a circuit realized using hardware such as an FPGA (Field Programmable Gate Array), an ASIC (Application Specified Integrated Circuit), or the like.

When the CPU 30 reads the program from the ROM 31, a functionality of a relay processing unit 300 is established. The relay processing unit 300 relays a packet between the server 4 and the parent node Np and the child node Nc. More specifically, the relay processing unit 300 temporarily stores, in the packet buffer 331, a packet to be transmitted/received via the communication port 34 or 35, and transfers the packet. In this process, the relay processing unit 300 performs a packet format conversion, a protocol conversion, and the like.

Figure 5:
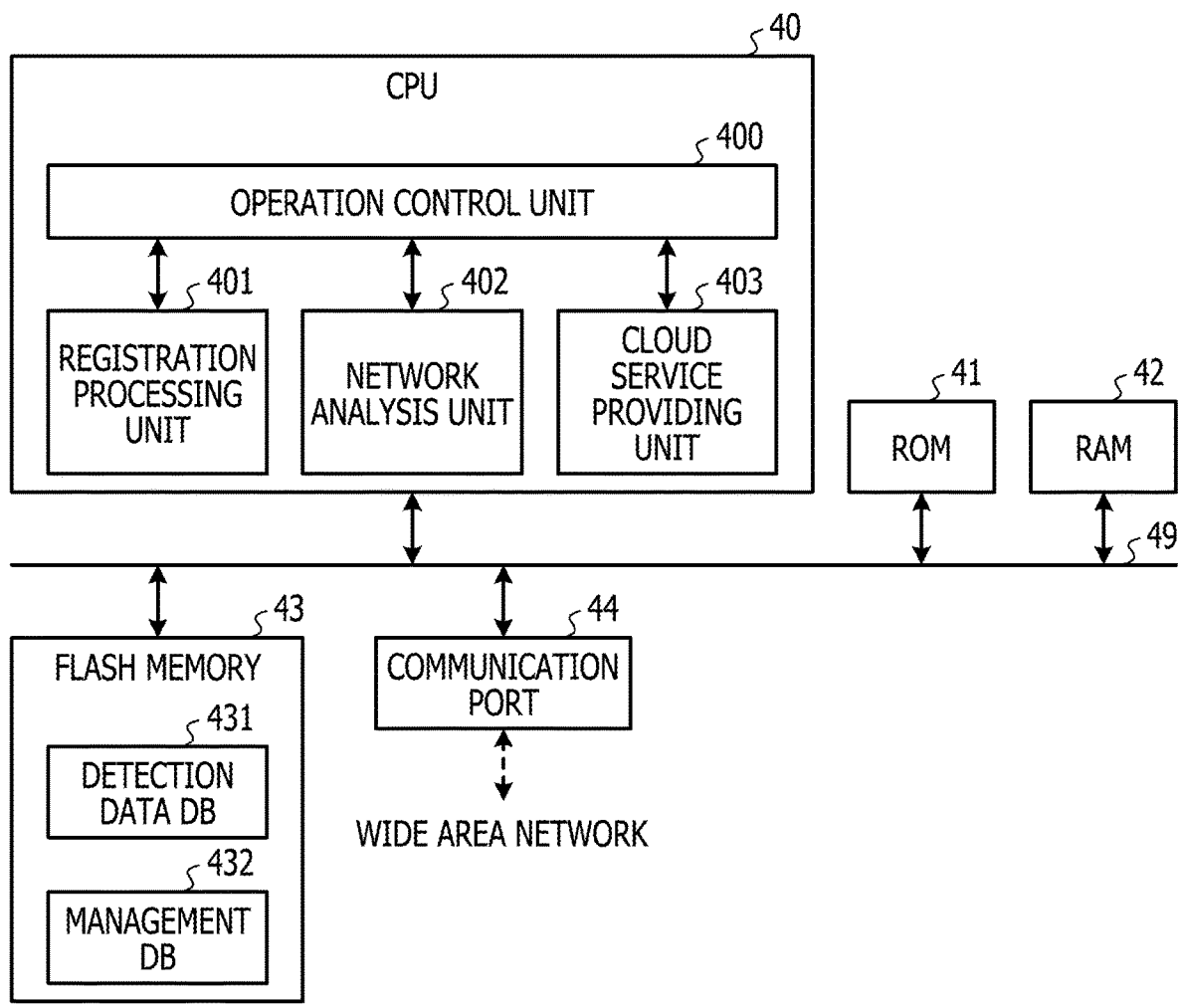
FIG. 5 is a block diagram illustrating an example of a server.

FIG. 5 is a block diagram illustrating an example of the server 4. The server 4 is coupled to the wide area network 91 and provides, for example, a cloud service using detection data.

The server 4 includes a CPU 40, a ROM 41, a RAM 42, a flash memory 43, and a communication port 44. The CPU 40 is coupled to the ROM 41, the RAM 42, the flash memory 43, and the communication port 44 via a bus 49 such that a signal can be input/output between each other.

In the ROM 41, a program for driving the CPU 40 is stored. The RAM 42 functions as a working memory of the CPU 40. In the flash memory 43, a detection data database (DB) 431 in which detection data is registered and a management database (DB) 432 in which management data is registered are stored.

The communication port 44 is, for example, a LAN controller and processes communication with the gateway 3 via the wide area network 91. Note that the communication port 44 is a circuit realized by hardware such as an FPGA, an ASIC, or the like.

When the CPU 40 reads the program from the ROM 41, functionalities of an operation control unit 400, a registration process unit 401, a network analysis unit 402, and a cloud service providing unit 403 are established. The operation control unit 400 controls an operation of the whole server 4. The operation control unit 400 instructs the registration process unit 401, the network analysis unit 402, and the cloud service providing unit 403 to execute various processes according to a particular sequence.

The registration process unit 401 extracts detection data or management data from a packet received via the communication port 44. The registration process unit 401 registers the detection data in the detection data database 431, and registers the management data in the management database 432.

The network analysis unit 402 executes a network analysis process based on the management database 432. The network analysis unit 402 analyzes the configuration of the ad hoc network NW based on the management database 432 and makes a prediction in terms of, for example, recovery and avoidance of failures on communication routes.

The cloud service providing unit 403 provides, in response to a user's request received via the communication port 44, a particular cloud service based on the detection data database 431.

Figure 6:
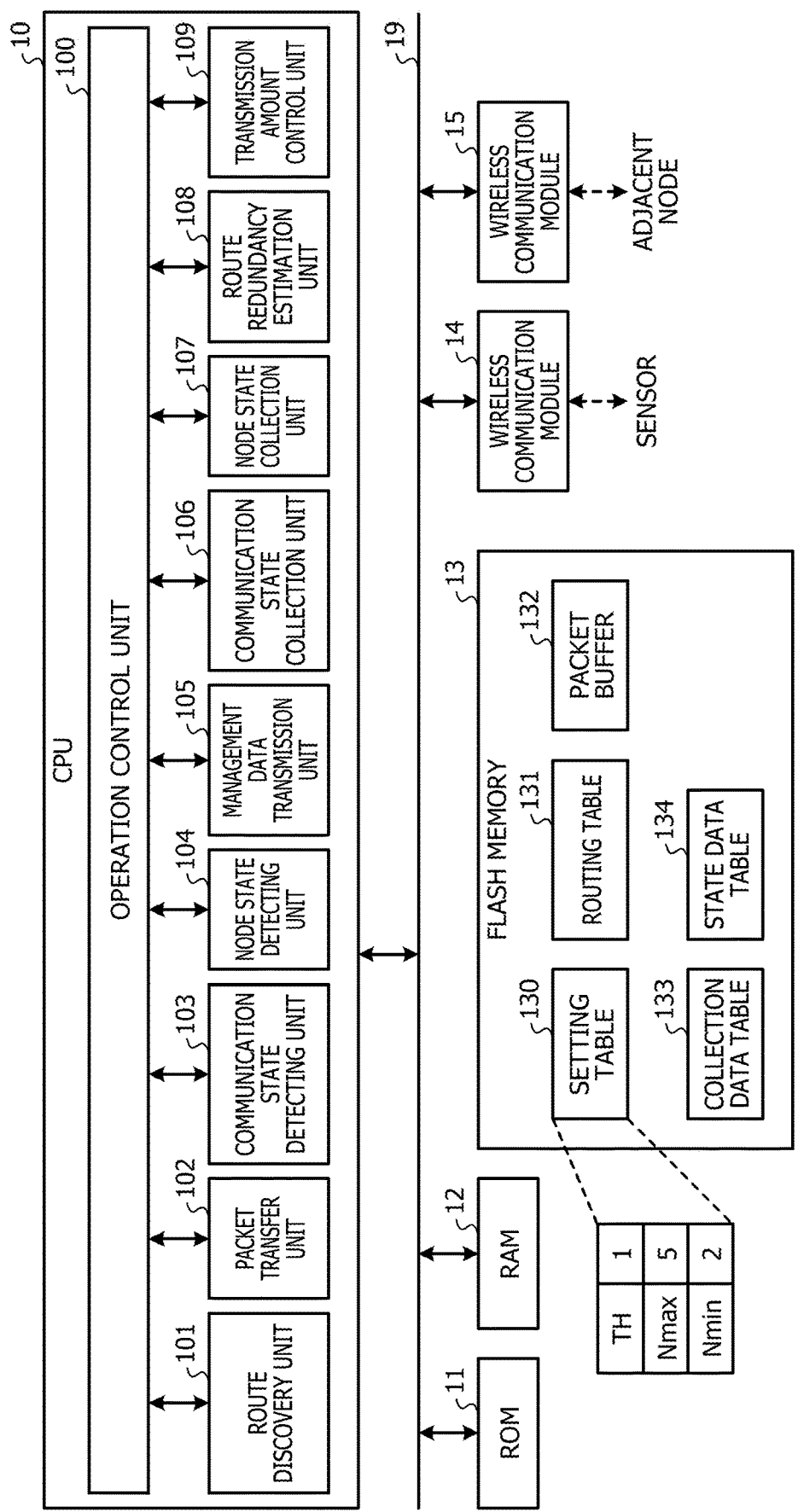
FIG. 6 is a block diagram illustrating an example of a child node.

FIG. 6 is a block diagram illustrating an example of a child node Nc. The child node Nc includes a CPU 10, a ROM 11, a RAM 12, a flash memory 13, and a wireless communication modules 14 and 15. The CPU 10 is coupled with the ROM 11, the RAM 12, the flash memory 13, and the wireless communication modules 14 and 15 via a bus 19 such that a signal can be input/output between each other. Note that the CPU 10 is an example of a computer. Instead of the CPU 10, another processor may be used.

In the ROM 11, programs for driving the CPU 10 are stored. The programs include a communication program for executing a communication method. The RAM 12 functions as a working memory of the CPU 10. In the flash memory 13, a setting table 130, a routing table 131, a packet buffer 132, a collection data table 133, and a state data table 134 are stored.

The wireless communication module 14 wirelessly communicates with a sensor Ns according to, for example, BLE. The wireless communication module 15 wirelessly communicates with adjacent nodes (Np, Nc) according to, for example, Wi-SUN or ZigBee. Note that the wireless communication modules 14 and 15 each are realized using hardware such as an antenna, a communication processing circuit, and the like.

When the CPU 10 reads the program from the ROM 11, functionalities of an operation control unit 100, a route discovery unit 101, a packet transfer processing unit 102, a communication state detection unit 103, a node state detection unit 104, a management data transmission unit 105, a communication state collection unit 106, a node state collection unit 107, a route redundancy estimation unit 108, and a transmission amount control unit 109 are established. Alternatively, the operation control unit 100, the route discovery unit 101, the packet transfer unit 102, the communication state detection unit 103, the node state detection unit 104, the management data transmission unit 105, the communication state collection unit 106, the node state collection unit 107, the route redundancy estimation unit 108, and the transmission amount control unit 109 each may be realized using a circuit such as an FPGA, an ASIC or the like.

The operation control unit 100 controls operations of the whole child node Nc. The operation control unit 100 instructs the route discovery unit 101, the packet transfer unit 102, the communication state detection unit 103, the node state detection unit 104, the management data transmission unit 105, the communication state collection unit 106, the node state collection unit 107, the route redundancy estimation unit 108, and the transmission amount control unit 109 to execute various processes according to a particular sequence.

The operation control unit 100 sets, according to the setting table 130, various parameters in the route discovery unit 101, the packet transfer unit 102, the communication state detection unit 103, the node state detection unit 104, the management data transmission unit 105, the communication state collection unit 106, the node state collection unit 107, the route redundancy estimation unit 108, and the transmission amount control unit 109.

In the setting table 130, for example, the threshold value TH of the route redundancy used in controlling the transmission amount of management data, an upper limit number Nmax (positive integer) and a lower limit number Nmin (a positive integer, Nmin<Nmax) which are control parameters defining a restriction on the transmission amount of management data, and the like are registered. For example, at the start of the operation, the operation control unit 100 reads the threshold value TH, the upper limit number Nmax, and the lower limit number Nmin from the setting table 130, and sets them in the transmission amount control unit 109.

The route discovery unit 101 searches for a communication route to the parent node Np by exchanging the control information with adjacent nodes (Np, Nc). When the route discovery unit 101 detects an occurrence of a failure from the control information, the route discovery unit 101 searches for a communication route to bypass a link where the failure occurs. The route discovery unit 101 registers the detected communication route in the routing table 131.

The packet transfer unit 102 transfers a packet to an adjacent node (Np, Nc) along an optimum communication route according to the routing table 131. More specifically, the packet transfer unit 102 acquires a packet to be transferred from the wireless communication module 14 or 15 and temporarily stores the acquired packet in the packet buffer 132. When the packet transfer unit 102 detects a next hop adjacent node (Np, Nc) according to a transfer route, the packet transfer unit 102 instructs the wireless communication module 15 to transfer the packet to the adjacent node (Np, Nc).

The communication state detection unit 103 detects a communication state of each adjacent node (Np, Nc), for example, periodically. More specifically, the communication state detection unit 103 acquires data regarding the communication state of each adjacent node (Np, Nc) via the wireless communication module 15. Examples of items of data regarding the communication state include RSSI, a packet error rate, and a response time. However, the items are not limited to those examples. The wireless communication module 15 measures the RSSI, the packet error rate, the response time, and the like in response to an instruction from the communication state detection unit 103.

The node state detection unit 104 detects the state of the child node Nc (the present child node), for example, periodically. More specifically, the node state detection unit 104 detects the movement state and the load state of the child node Nc. Note that the items of the state of the child node Nc are not limited to the movement state and the load state. For example, the items may include a remaining battery capacity or the like, or the items may include only one of the movement state and the load state.

The node state detection unit 104 detects, as the movement state, whether the child node Nc is moving or not moving. The movement state may be detected based on a detected value of an acceleration sensor or based on a change in RSSI, although the method of detecting the movement state is not limited to those examples.

Furthermore, the node state detection unit 104 detects, as the load state, whether the child node Nc is in an overload state or a normal state. The load state may be detected, for example, based on a load average or a usage rate of the CPU 10, although the method is not limited to these examples.

As described above, the node state detection unit 104 detects, as an example of the detection unit, at least one of the load state and the movement state of the child node Nc.

The node state detection unit 104 registers the movement state and the load state in the state data table 134. The communication state detection unit 103 registers the communication state in the state data table 134.

FIG. 7 is a diagram illustrating an example of the state data table 134. In the state data table 134, the communication state and the node state are registered. The items of the communication state include RSSI, a packet error rate, and a response time, and the items of the node state include a route redundancy, a movement state, and a load state. Of the items of the node state, the route redundancy is registered by the route redundancy estimation unit 108.

Referring again to FIG. 6, the management data transmission unit 105 transmits, as an example of the transmission unit, management data to the parent node Np.

More specifically, the management data transmission unit 105 acquires, for example, periodically, information regarding the communication state of adjacent nodes (Np, Nc) from the collection data table 133 and acquires information regarding the node state of the present child node from the state data table 134. The management data transmission unit 105 generates a packet containing management data such as that illustrated in FIG. 2 based from the information regarding the node state of the present child node and the information regarding the communication state of the adjacent nodes (Np, Nc). That is, the management data includes information regarding the node state of the present child node and the information regarding the communication state of the adjacent nodes (Np, Nc).

The management data transmission unit 105 transmits the packet containing the management data via the wireless communication module 15. In this transmission process, the management data transmission unit 105 transmits the packet to the adjacent nodes (Np, Nc) along an optimum communication route according to the routing table 131.

Furthermore, in the transmission process by the management data transmission unit 105, the transmission amount of the management data is controlled by the transmission amount control unit 109. According to the communication state information regarding the adjacent nodes (Np, Nc), the management data transmission unit 105 transmits management data regarding adjacent nodes (Np, Nc) such that high priority is given, in the transmission, to the management data regarding adjacent node being in good communication states. Thus, the management data transmission unit 105 is capable of transmitting management data useful for the server 4 to search for a more reliable communication route.

The communication state collection unit 106, which is an example of the first collection unit, collects information regarding the communication state of each adjacent node (Np, Nc). More specifically, the communication state collection unit 106 receives a packet indicting, for example, RSSI, a packet error rate, and a response time from each adjacent node (Np, Nc) via the wireless communication module 15. Note that data of the RSSI, the packet error rate, and the response time is an example of first data regarding the communication state of each adjacent node (Np, Nc). Note that the items of the information regarding the communication state collected by the communication state collection unit 106 are not limited to the RSSI, the packet error rate, and the response time.

The communication state collection unit 106 reads out the information indicting the communication state of the present child node from the state data table 134 and places it in a packet, and transmits the packet to each adjacent node (Np, Nc) via the wireless communication module 15. Note that this process is performed, for example, periodically.

As described above, the communication state collection unit 106 exchanges information regarding the communication state with each adjacent node (Np, Nc). Note that the exchange of the information regarding the communication state may be performed, for example, using a transmission/reception process of a HELLO message used in route searching.

The node state collection unit 107 is an example of the second collection unit and collects information regarding the node state of adjacent nodes (Np, Nc). More specifically, the node state collection unit 107 receives a packet indicating, for example, a load state, a movement state, and a route redundancy via the wireless communication module 15. Note that data of the load state, the movement state, and the route redundancy of the adjacent node (Np, Nc) is an example of the third data, and the route redundancy of the adjacent node (Np, Nc) is an example of the communication route state. Note that the items of the information regarding the node state collected by the node state collection unit 107 are not limited to the load state, the movement state, and the route redundancy. For example, at least one of the load state, the movement state, and the route redundancy may be collected.

The node state collection unit 107 reads out information regarding the node state of the present child node from the state data table 134, places it in a packet, and transmits the packet to each adjacent node (Np, Nc) via the wireless communication module 15. For example, this process may be performed periodically.

As described above, the node state collection unit 107 exchanges the information regarding the node state with each adjacent node (Np, Nc).

The communication state collection unit 106 and the node state collection unit 107 register the collected information in the collection data table 133. The communication state collection unit 106 and the node state collection unit 107 periodically collects the information from the adjacent nodes (Np, Nc) and updates the collection data table 133.

FIG. 8 is a diagram illustrating an example of the collection data table 133. In the collection data table 133, the adjacent node ID, the communication state, and the node state are registered.

The adjacent node ID is an identifier of an adjacent node (Np, Nc). More specifically, for example, the adjacent node ID is represented by a MAC address. For example, when the wireless communication module 15 detects an adjacent node (Np, Nc), the wireless communication module 15 detects its adjacent node ID and notifies the communication state collection unit 106 and the node state collection unit 107 of the detected adjacent node ID. The communication state collection unit 106 and the node state collection unit 107 collect information separately for each adjacent node ID.

Information regarding the communication state includes information indicating RSSI, a packet error rate, and a response time, and information regarding the node state includes information indicating the route redundancy, the movement state, and the load state. The information regarding the communication state is transmitted by the management data transmission unit 105 as a part of the management data to the parent node Np, while the transmission amount thereof is controlled by the transmission amount control unit 109.

Referring again to FIG. 6, the route redundancy estimation unit 108, functioning as an example of the estimation unit, estimates the number of adjacent nodes (Np, Nc) capable of providing a communication route satisfying a particular criterion of communication quality based on the information regarding the communication state and the node state of each adjacent node (Np, Nc), that is, the route redundancy estimation unit 108 estimates the route redundancy. In this process, the route redundancy estimation unit 108 may estimate the route redundancy based only on the information regarding the communication state of each adjacent node (Np, Nc). However, estimating based on the communication state and the node state of each adjacent node (Np, Nc) as described above makes it possible to achieve high accuracy in the estimation of the route redundancy. The estimation process of the route redundancy will be described in further detail later.

The transmission amount control unit 109 is an example of the control unit and controls the transmission amount of the management data transmitted by the management data transmission unit 105 depending on the route redundancy. This makes it possible for the child node Nc to reduce the transmission amount of the management data depending on the reliability of the communication route of each adjacent node (Np, Nc), and thus it becomes possible to transmit the management data such that the higher the risk of decoupling of the communication route, the greater amount of management data is transmitted.

Thus, the server 4 is capable of analyzing the configuration of the ad hoc network NW based on the management data and making a prediction in terms of, for example, recovery and avoidance of failures on communication routes. Thus, the child node Nc is capable of reducing the transmission amount of management data without causing a reduction in usefulness of the data.

In a case where the route redundancy is higher than or equal to the threshold value TH, the transmission amount control unit 109 reduces the transmission amount of the management data transmitted by the management data transmission unit 105 so as to be lower than in a case where the route redundancy is lower than the threshold value TH. This makes it possible for the child node Nc to reduce the transmission amount of the management data depending on the reliability of the communication route of each adjacent node (Np, Nc), and thus it becomes possible to transmit the management data such that the higher the risk of decoupling of the communication route, the greater amount of management data is transmitted.

The transmission amount control unit 109 controls the transmission of the management data such that the transmission amount of the information regarding the communication state of each adjacent node (Np, Nc), which is part of the management data, is controlled depending on the route redundancy as described above with reference to FIG. 2. This makes it possible to effectively reduce the transmission amount of the management data. Note that the management data includes information regarding the route redundancy of each adjacent node (Np, Nc), and this results in an increase in usefulness of the management data.

Furthermore, depending on the route redundancy estimated by the route redundancy estimation unit 108, the transmission amount control unit 109 determines the upper limit number of adjacent nodes (Np, Nc) to which the information regarding the communication state is to be transmitted by the management data transmission unit 105 thereby controlling the transmission amount of the management data. Thus, the transmission amount control unit 109 is capable of controlling the transmission amount of management data individually for each node.

Figure 9:
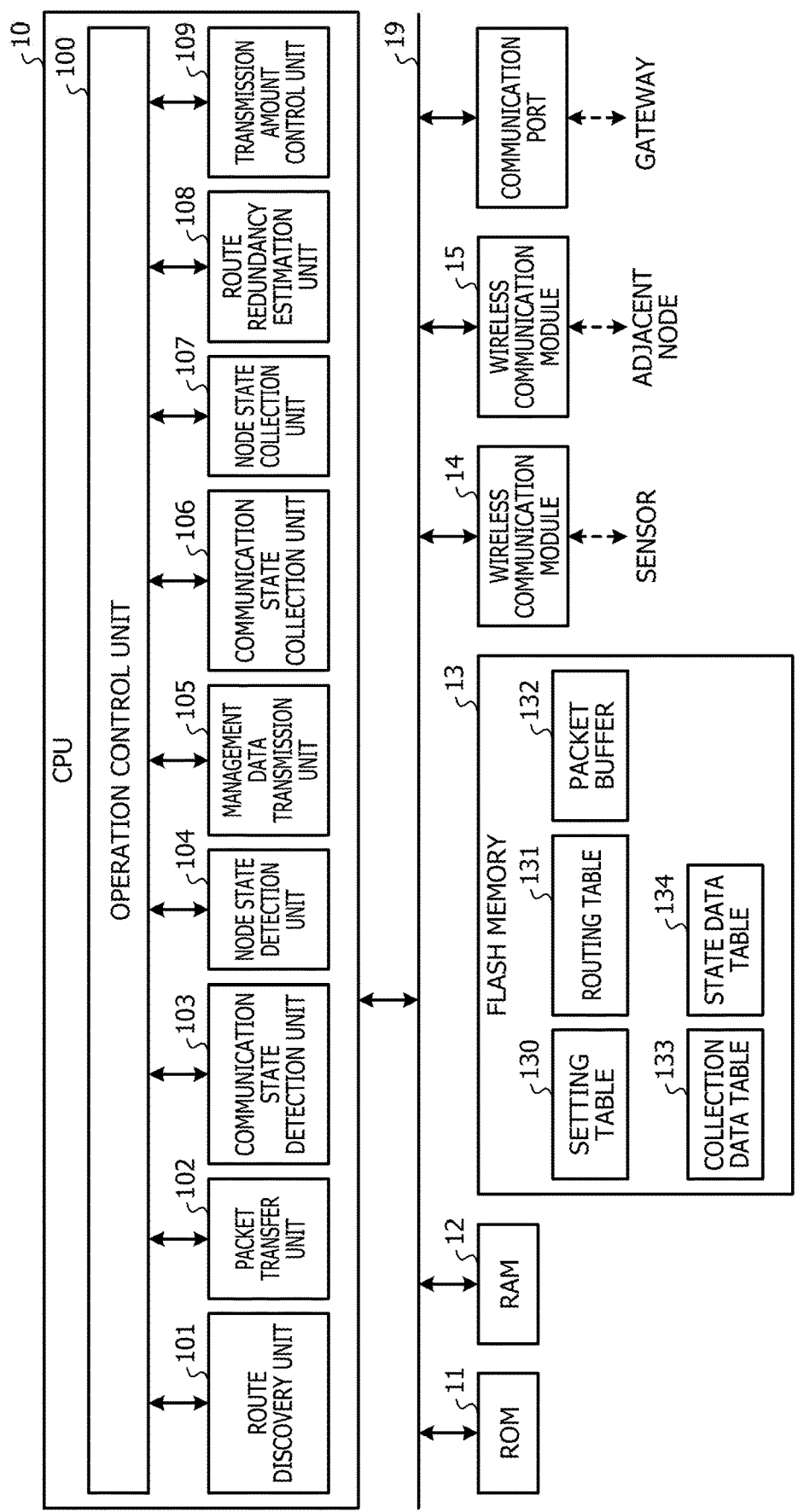
FIG. 9 is a block diagram illustrating an example of a parent node.

FIG. 9 is a block diagram illustrating an example of a parent node Np. In FIG. 9, elements similar to those in FIG. 6 are denoted by similar reference symbols, and a further description thereof is omitted.

The parent node Np includes a CPU 10, a ROM 11, a RAM 12, a flash memory 13, a communication port 16, and wireless communication modules 14 and 15. The CPU 10 is coupled to the ROM 11, the RAM 12, the flash memory 13, the communication port 16, and the wireless communication modules 14 and 15 via a bus 19 such that a signal can be input/output between each other.

The communication port 16 is, for example, a USB controller and processes communication with the gateway 3. Note that the communication port 16 is a circuit realized using hardware such as an FPGA, an ASIC, or the like.

When the CPU 10 reads out a program from the ROM 11, functionalities of an operation control unit 100, a route discovery unit 101, a packet transfer unit 102a, a communication state detection unit 103, a node state detection unit 104, a management data transmission unit 105a, a communication state collection unit 106, a node state collection unit 107, a route redundancy estimation unit 108, and a transmission amount control unit 109 are established.

The operation control unit 100 controls the whole operation of the parent node Np. The operation control unit 100 instructs the route discovery unit 101, the packet transfer unit 102a, the communication state detection unit 103, the node state detection unit 104, the management data transmission unit 105a, the communication state collection unit 106, the node state collection unit 107, the route redundancy estimation unit 108, and the transmission amount control unit 109 to execute various processes according to a particular sequence.

The management data transmission unit 105a generates a packet containing management data from the node state information stored in the state data table 134 and the communication state information stored in the collection data table 133, and transmits the generated packet to the gateway 3 via the communication port 16. In the transmission by the management data transmission unit 105a, as with the transmission by the management data transmission unit 105 of the child node Nc, the transmission amount of the management data of the parent node Np is controlled by the transmission amount control unit 109.

In the operation of the packet transfer unit 102a, unlike the packet transfer unit 102 of the child node Nc, when a packet containing detection data or management data is received from an adjacent node (Np, Nc), the packet transfer unit 102a temporarily stores the packet in the packet buffer 132 and then outputs it to the communication port 16. As a result, the detection data and the management data are transferred to the server 4 via the gateway 3.

As described above, the parent node Np collects management data from each child node Nc, and transmits the collected management data together with the management data of the parent node Np itself to the server 4 via the gateway 3. This makes it possible for the server 4 to analyze the overall configuration of the ad hoc network NW. In contrast, each child node Nc has lower processing power than that of the server 4, and thus it is difficult for the child node Nc to analyze the overall configuration of the ad hoc network NW although it is possible to estimate the risk of decoupling of a nearby communication route from the communication states of the adjacent nodes (Np, Nc).

Next, an operation of the child node Nc is described below.

Figure 10:
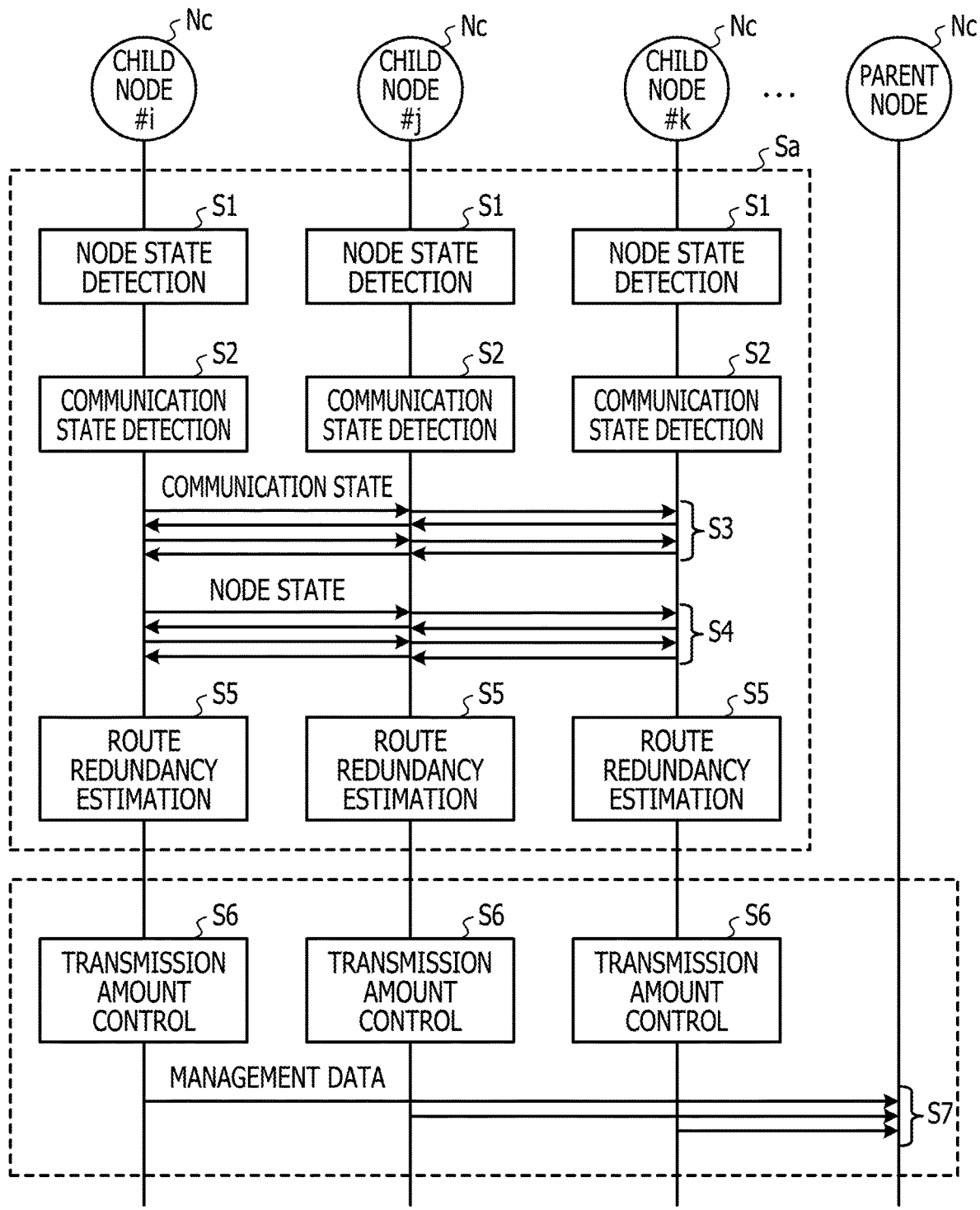
FIG. 10 is a sequence diagram illustrating an example of an operation of child nodes.

FIG. 10 is a sequence diagram illustrating an example of an operation of the child node Nc. In this example, child nodes (#i, #j, #k) Nc (i, j, k: positive integer) are located adjacent to each other. The operation control unit 100 of each child node Nc instructs that processes S1 to S5 are to be executed such that the period of the processes S1 to S5 denoted by symbol Sa is shorter than the period of the processes S6 and S7 denoted by symbol Sb. Note that this sequence is an example of an operation according to a communication method and a communication program.

The node state detection unit 104 detects the node state (the movement state and the load state) of the child node (process S1), and registers the detected node state in the state data table 134. Next, the communication state detection unit 103 detects the communication state (the RSSI, the packet error rate, and the response time) of the child node (process S2), and registers the detected communication state in the state data table 134.

Next, the communication state collection unit 106 collects the information regarding the communication state (the RSSI, the packet error rate, and the response time) from each adjacent node Nc using a HELLO message or the like (process S3), and registers the collected information in the collection data table 133. In this process, information is exchanged with adjacent child nodes (#i to #k) Nc. Although only information regarding the latest communication state is registered in the collection data table 133 in the present example, information regarding communication states collected in previous several collection cycles may be registered.

Next, the node state collection unit 107 collects information regarding the node state (the route redundancy, the movement state, and the load state) from each adjacent node Nc (process S4) and registers the collected information in the collection data table 133. In the process, information regarding the node state is exchanged with adjacent child nodes (#i to #k) Nc. Although only information regarding the latest node state is registered in the collection data table 133 in the present example, information regarding node sates collected in previous several collection cycles may be registered.

Next, the route redundancy estimation unit 108 estimates the route redundancy based on the node state in the state data table 134 and the communication state in the collection data table 133 (process S5).

Figure 11:
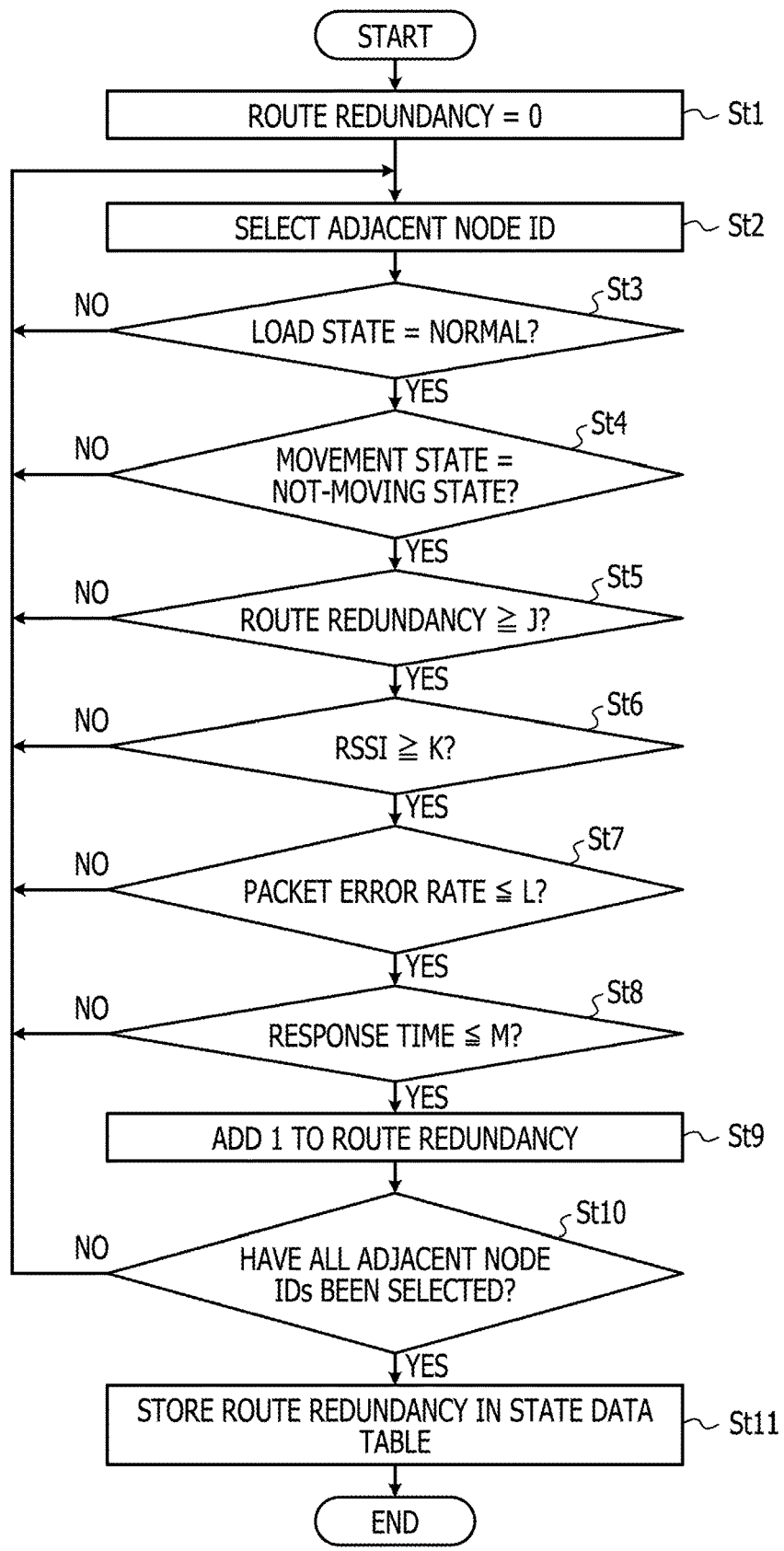
FIG. 11 is a flow chart illustrating an example of a route redundancy estimation process.

FIG. 11 is a flow chart illustrating an example of a route redundancy estimation process. The route redundancy estimation unit 108 initializes the route redundancy to 0 (step St1). Next, the route redundancy estimation unit 108 selects one of adjacent node IDs detected by the wireless communication module 15 (step St2). In the following steps St3 to St8, an estimation is made on various data associated with the adjacent node (Np, Nc) corresponding to the selected adjacent node ID.

The route redundancy estimation unit 108 estimates whether the load state is normal or not (step St3). In a case where the load state indicates that the node of interest is in an overload state (No in step St3), the route redundancy estimation unit 108 selects another adjacent node ID (step St2). Thereafter, processes following step St3 are executed.

In a case where the load state is normal (Yes in step St3), the route redundancy estimation unit 108 estimates whether the movement state indicates that the node of interest is not moving (step St4). In a case where the movement state indicates that the node of interest is moving (No in step St4), the route redundancy estimation unit 108 selects another adjacent node ID (step St2). Thereafter, processes following step St3 are executed.

In a case where the movement state indicates that the node of interest is not moving (Yes in step St4), the route redundancy estimation unit 108 compares the route redundancy with a predetermined value J (a positive integer, for example, 1) (step St5). In a case where the route redundancy is smaller than the predetermined value J (No in step step St5), the route redundancy estimation unit 108 selects another adjacent node ID (step St2). Thereafter, processes following step St3 are executed.

In a case where the route redundancy greater than or equal to the predetermined value J (Yes in step St5), the route redundancy estimation unit 108 compares the RSSI with a predetermined value K (step St6). In a case where the RSSI is smaller than the predetermined value K (No in step St6), the route redundancy estimation unit 108 selects another adjacent node ID (step St2). Thereafter, processes following step St3 are executed.

In a case where the RSSI is greater than or equal to the predetermined value K (Yes in step St6), the route redundancy estimation unit 108 compares the packet error rate with a predetermined value L. In a case where the packet error rate is greater than the predetermined value L (No in step St7), the route redundancy estimation unit 108 selects another adjacent node ID (step St2). Thereafter, processes following step St3 are executed.

In a case where the packet error rate is lower than or equal to a predetermined value L (Yes in step St7), the route redundancy estimation unit 108 compares the response time with a predetermined value M (step St8). In a case where the response time is greater than the predetermined value M (No in step St8), the route redundancy estimation unit 108 selects another adjacent node ID (step St2). Thereafter, processes following step St3 are executed.

In a case where the response time is lower than the predetermined value M (Yes in step St8), the route redundancy estimation unit 108 adds 1 to the route redundancy (step St9).

Next, the route redundancy estimation unit 108 estimates whether all adjacent node IDs have been selected (step St10). In a case where there is an unselected adjacent node ID (No in step St10), the route redundancy estimation unit 108 selects another adjacent node ID (step St2). Thereafter, processes following step St3 are executed.

In a case where all adjacent node IDs have been selected (Yes in step St10), the route redundancy estimation unit 108 stores the route redundancy in the state data table 134 (step St11). The route redundancy is used by the transmission amount control unit 109 in controlling the transmission amount of the management data. The route redundancy estimation process is executed in the manner described above. Note that the predetermined values J, K, L, and M are registered in advance, for example, in the setting table 130.

As described above, the route redundancy estimation unit 108 estimates the route redundancy based on the information regarding the communication state and the ode state of each adjacent node (Np, Nc). More specifically, the route redundancy estimation unit 108 estimates the route redundancy individually for each adjacent node (Np, Nc) and increases the route redundancy only in a case where all parameters associated with the information regarding the communication state and the node state are good from the point of view of the communication quality. Thus, the route redundancy indicates the number of adjacent nodes (Np, Nc) capable of providing a communication route with communication quality satisfying the particular criterion.

Referring again to FIG. 10, after the route redundancy estimation process, the transmission amount control unit 109 controls the transmission amount of the management data transmitted by the management data transmission unit 105 depending on the route redundancy (process S6). Next, the management data transmission unit 105 transmits the management data to the parent node Np by a transmission amount controlled by the transmission amount control unit 109 (process S7). In this way, the child node Nc operates.

Figure 12:
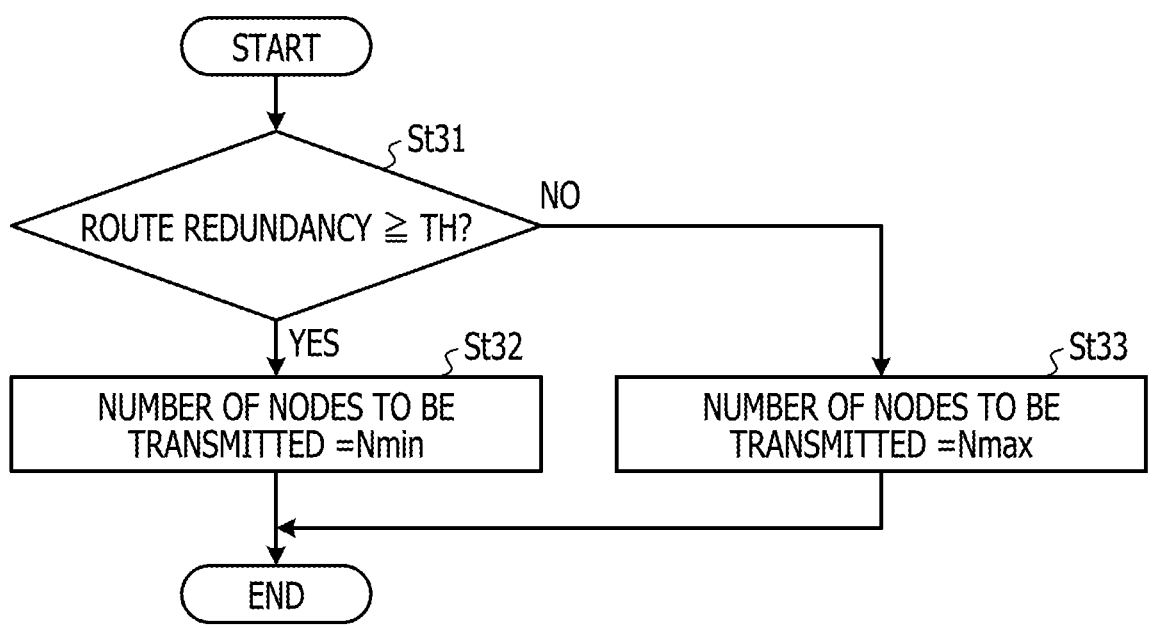
FIG. 12 is a flow chart illustrating an example of a process of controlling a transmission amount of management data.

FIG. 12 is a flow chart illustrating an example of a process of controlling the transmission amount of the management data. This process corresponds to process S6 described above.

The transmission amount control unit 109 compares the route redundancy of the state data table 134 with a threshold value TH (1, in the present example) (step St31). In a case where the route redundancy is equal to or greater than the threshold value TH (Yes in step St31), the transmission amount control unit 109 determines the number of adjacent nodes (Np, Nc) to be subjected to the transmission of information regarding the communication state in the management data such that the maximum number of adjacent nodes (Np, Nc) is equal to the lower limit number Nmin (2, in the present example) (step St32). As a result, only the information regarding the communication state of the two adjacent nodes Np and Nc is subjected to the transmission, and thus a reduction in the transmission amount of the management data occurs.

On the other hand, in a case where the route redundancy is smaller than the threshold value TH (No in step St31), the transmission amount control unit 109 determines the number of adjacent nodes (Np, Nc) to be subjected to the transmission of information regarding the communication state in the management data such that the maximum number of adjacent nodes (Np, Nc) is equal to the upper limit number Nmax (5, in the present example) (step St33). As a result, information regarding the communication state of five adjacent nodes (Np, Nc) is transmitted, and thus the transmission amount of the management data increases.

As described above, the transmission amount control unit 109 controls, depending on the route redundancy, the transmission amount of the management data transmitted by the management data transmission unit 105. More specifically, if the route redundancy is greater than or equal to the particular threshold value TH, then in a process in step St32, the transmission amount control unit 109 reduces the transmission amount of the management data so as to be smaller than in a case where the route redundancy is smaller than the particular threshold value TH. Thus, the child node Nc can reduce the transmission amount of the management data depending on the reliability of the communication route of each adjacent node (Np, Nc). That is, it is possible to control the transmission amount of the management data such that the higher the risk of decoupling of a communication route, the greater amount of management data is transmitted.

Furthermore, the transmission amount control unit 109 controls the transmission amount of the management data by determining the number of nodes subjected to the transmission so as to be equal to the lower limit number Nmin or the upper limit number Nmax depending on the route redundancy estimated by the route redundancy estimation unit 108. This makes it possible for the transmission amount control unit 109 to control the transmission amount of the management data on a node by node basis. Note that the transmission amount control unit 109 may determine directly the transmission amount depending on the route redundancy. In this case, the management data transmission unit 105 selects information regarding the communication state to be transmitted within the determined allowable range of the transmission amount on a node by node basis.

Figure 13:
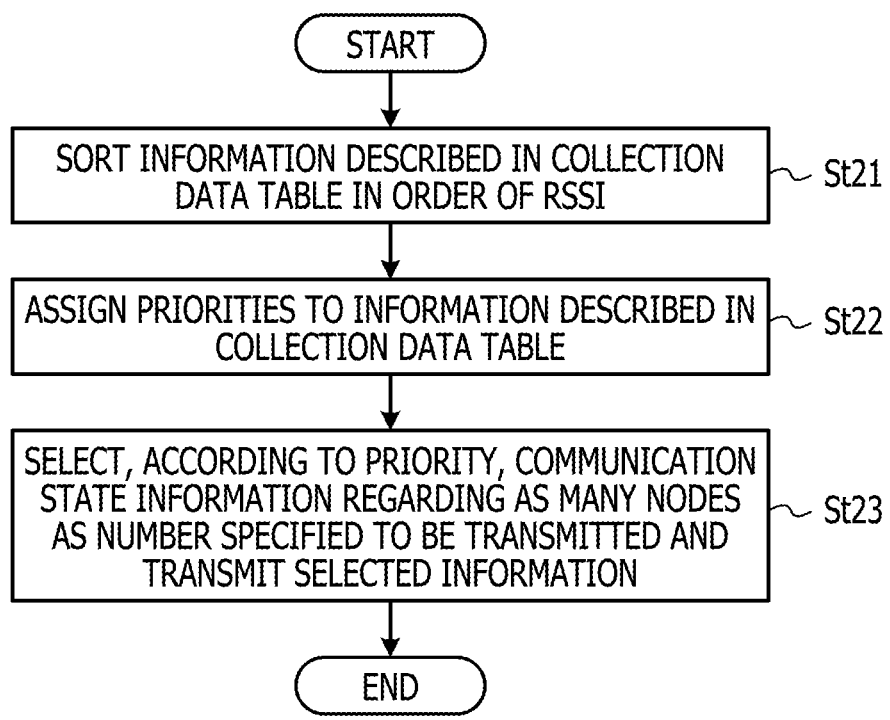
FIG. 13 is a flow chart illustrating an example of a process of transmitting management data.

FIG. 13 is a flow chart illustrating an example of a management data transmission process. The management data transmission unit 105 sorts the information in the collection data table 133, for example, in order of RSSI (step St21). Next, the management data transmission unit 105 assigns priority to the information in the collection data table 133 (step St22).

Next, the management data transmission unit 105 selects, according to the priority, communication state information regarding as many nodes as the number specified to be transmitted, and transmits the selected information (step St23). The selection of the information regarding the communication state to be transmitted is described in further detail below taking as an example the collection data table 133 illustrated in FIG. 8.

FIG. 14 is a diagram illustrating an example of a manner of selecting information regarding the communication state to be transmitted. The management data transmission unit 105 sorts the information in the collection data table 133 in descending order of RSSI. Alternatively, the management data transmission unit 105 may perform sorting in descending order of response time, or may perform sorting according to two or more items (the RSSI, the packet error rate, and the response time) of the information.

The management data transmission unit 105 sequentially assigns priorities (1 to 6) to the sorted information. As a result, the greater the RSSI of the information, the higher priority is assigned. In this specific example, the highest priority "1" is assigned to information with an adjacent node ID of "XX:XX:XX:05", while the lowest priority "6" is assigned to the information with an adjacent node ID of "XX:XX:XX:0A".

In a case where the number of nodes to be subjected to the transmission is equal to the upper limit number Nmax (=5), the management data transmission unit 105 selects information with priorities "1" to "5" as denoted by a dashed line and transmits the selected information. On the other hand, in a case where the number of nodes to be subjected to the transmission is equal to the lower limit number Nmin (=2), the management data transmission unit 105 selects information with priorities "1" and "2" as denoted by a broken line and transmits the selected information. As a result, information regarding good communication states is selected according to the RSSI and preferentially transmitted to parent node Np.

As described above, based on the information regarding the communication states, the management data transmission unit 105 selects management data associated with adjacent nodes (Np, Nc) being in good communication states and preferentially transmits the selected management data. Thus, the management data transmission unit 105 is capable of transmitting management data useful for the server 4 to search for a more reliable communication route.

Note that the above-described processing function can be implemented by a computer. In this case, a program is provided that describes a content of the process of the function to be possessed by a processing apparatus. By executing the program by the computer, the processing function is implemented on the computer. The program describing the content of the process may be stored in a computer-readable storage medium (other than a carrier wave).

The program may be distributed, for example, such that the program is stored in a portable storage medium such as a DVD (Digital Versatile Disc), a CD-ROM (Compact Disc Read Only Memory), and the portable storage medium may be sold. The program may be stored in a storage apparatus of a server computer, and the program may be transferred from the server computer to another computer via a network.

To make it possible for the computer to execute the program, for example, the computer acquires the program by reading the program from the portable storage medium or by receiving the program transferred from the server computer, and the computer stores the acquired program in a storage apparatus in the computer. The computer reads out the program from the storage apparatus of the computer and executes a process according to the program. Alternatively, the computer may read out the program direction from the portable storage medium and may execute a process according to the program. Still alternatively, the computer may receive the program transmitted from the server computer and may execute the process according to the received program each time the computer receives the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
a first communication apparatus included in an ad hoc network; and
a second communication apparatus included in the ad hoc network, the second communication apparatus being coupled to a gateway and being configured to receive data from the first communication apparatus,
wherein
the first communication apparatus includes:
a memory; and
a processor coupled to the memory and configured to:
acquire first information regarding communication quality between the first communication apparatus and each of a plurality of adjacent nodes in the ad hoc network;
obtain a first number by counting, based on the first information, a number of first adjacent nodes from among the plurality of adjacent nodes, each of the first adjacent nodes being a node whose communication quality with the first communication apparatus is equal to or greater than a first value; and
control, based on the first number, a transmission amount of the data to be transmitted to the second communication apparatus through the ad hoc network, the control of the transmission amount being configured to
use a first transmission amount when the first number is equal or greater than a threshold, and
use a second transmission amount greater than the first transmission amount when the first number is less than the threshold.

2. The communication system according to claim 1, wherein
the data is to be used by the second communication apparatus for managing the ad hoc network, and
the processor is configured to, in a case where the first number is equal to or greater than the threshold, reduce the transmission amount of the data to a value lower than in a case where the first number is less than the threshold.

3. The communication system according to claim 1, wherein
the processor is configured to transmit the data of the adjacent nodes of which the communication quality is equal to or greater than the first value.

4. The communication system according to claim 1, wherein
the data includes the first information, and
the processor is configured to determine, based on the first number, an upper limit number of the adjacent nodes which are included in the plurality of adjacent nodes and which are to be subjected to the transmission of the data.

5. The communication system according to claim 1, wherein
the processor is configured to detect at least one of a load state and a movement state of the first communication apparatus;
wherein
the data includes the first information and at least one of the load state and the movement state; and
the processor is configured to control the transmission amount of the first information in the data based on the first number.

6. The communication system according to claim 5, wherein
the data includes the first number.

7. The communication system according to claim 1, wherein
the processor is configured to:
acquire second information regarding at least one of a load state, a movement state, and a communication route state of each of the plurality of adjacent nodes; and
determine the first number based on the first information and the second information.

8. A method implemented by a first communication apparatus in a communication system including an ad hoc network, the ad hoc network including the first communication apparatus and a second communication apparatus, the second communication apparatus being coupled to a gateway and being configured to receive data from the first communication apparatus, the method comprising:
acquiring, by the first communication apparatus, first information regarding communication quality between the first communication apparatus and each of a plurality of adjacent nodes in the ad hoc network;
obtain a first number by counting, based on the first information, a number of first adjacent nodes from among the plurality of adjacent nodes, each of the first adjacent nodes being a node whose communication quality with the first communication apparatus is equal to or greater than a first value; and
controlling, based on the first number, a transmission amount of the data to be transmitted to the second communication apparatus through the ad hoc network, the control of the transmission amount being configured to
use a first transmission amount when the first number is equal or greater than a threshold, and
use a second transmission amount greater than the first transmission amount when the first number is less than the threshold.

9. The method according to claim 8, wherein
the data is to be used by the second communication apparatus for managing the ad hoc network, and
the method further comprising:
in a case where the first number is equal to or greater than the threshold, reducing, by the first communication apparatus, the transmission amount of the data to a value lower than in a case where the first number is less than the threshold.

10. The method according to claim 8, further comprising:
transmitting, by the first communication apparatus, the data of the adjacent nodes of which the communication quality is equal to or greater than the first value.

11. The method according to claim 8, wherein
the data includes the first information, and
the method further comprising:
determining, by the first communication apparatus, based on the first number, an upper limit number of the adjacent nodes which are included in the plurality of adjacent nodes and which are to be subjected to the transmission of the data.

12. The method according to claim 8, further comprising:
detecting, by the first communication apparatus, at least one of a load state and a movement state of the first communication apparatus,
wherein
the data includes the first information and at least one of the load state and the movement state, and
in the controlling, the transmission amount of the first information in the data is controlled based on the first number.

13. The method according to claim 12, wherein
the data includes the first number.

14. The method according to claim 8, further comprising:
acquiring, by the first communication apparatus, second information regarding at least one of a load state, a movement state, and a communication route state of each of the plurality of adjacent nodes; and
determining, by the first communication apparatus, the first number based on the first information and the second information.

15. A non-transitory computer-readable storage medium storing a program that causes a processor of a first communication apparatus to execute a process, the first communication apparatus being included in an ad hoc network, the process comprising:
acquiring first information regarding communication quality between the first communication apparatus and each of a plurality of adjacent nodes in the ad hoc network;
obtain a first number by counting, based on the first information, a number of first adjacent nodes from among the plurality of adjacent nodes, each of the first adjacent nodes being a node whose communication quality with the first communication apparatus is equal to or greater than a first value; and
controlling, based on the first number, a transmission amount of the data to be transmitted to a second communication apparatus through the ad hoc network, the second communication apparatus being coupled to a gateway and configured to receive the data from the first communication apparatus, the control of the transmission amount being configured to
use a first transmission amount when the first number is equal or greater than a threshold, and
use a second transmission amount greater than the first transmission amount when the first number is less than the threshold.

16. The non-transitory computer-readable storage medium according to claim 15, wherein
the data is to be used by the second communication apparatus for managing the ad hoc network, and
the process further comprising:
in a case where the first number is equal to or greater than the threshold, reducing the transmission amount of the data to a value lower than in a case where the first number is less than the threshold.

17. The non-transitory computer-readable storage medium according to claim 15, the process further comprising:
transmitting the data of the adjacent nodes of which the communication quality is equal to or greater than the first value.

18. The non-transitory computer-readable storage medium according to claim 15, wherein
the data includes the first information, and
the process further comprising:
determining based on the first number, an upper limit number of the adjacent nodes which are included in the plurality of adjacent nodes and which are to be subjected to the transmission of the data.

19. The non-transitory computer-readable storage medium according to claim 15, the process further comprising:
detecting at least one of a load state and a movement state of the first communication apparatus,
wherein
the data includes the first information and at least one of the load state and the movement state, and
in the controlling, the transmission amount of the first information in the data is controlled based on the first number.

20. The non-transitory computer-readable storage medium according to claim 19, wherein
the data includes the first number.

* * * * *